United States Patent [19]
Bryer

[11] 4,040,107
[45] Aug. 2, 1977

[54] DISK POSITIONING AND EJECTION DEVICE IN A DISK DRIVE

[75] Inventor: Philip Stuart Bryer, Tarzana, Calif.

[73] Assignee: PerSci, Inc., Marina Del Rey, Calif.

[21] Appl. No.: 678,995

[22] Filed: Apr. 21, 1976

[51] Int. Cl.² .............................................. G11B 17/04
[52] U.S. Cl. ...................................... 360/99; 274/9 B
[58] Field of Search ........................... 360/99, 86, 135; 346/137; 274/9 B, 19, 40

[56] References Cited
U.S. PATENT DOCUMENTS

| 3,890,643 | 6/1975 | Dalziel | 360/99 |
| 3,940,793 | 2/1976 | Bleiman | 360/99 |

*Primary Examiner*—Bernard Konick
*Assistant Examiner*—John H. Wolff

*Attorney, Agent, or Firm*—Ralf H. Siegemund

[57] ABSTRACT

A flexible disk is automatically coupled to a drive spindle following insertion in the drive, but decoupled and ejected on command. The positioning and ejection control runs through a three-phase cycle which halts at the end of the positioning phase and is terminated at the end of the ejection phase while disk de-coupling and ejection phases follow directly. The ejection device has an override if an obstacle holds the disk in the drive. The three-phase cycle is cam-operated, using a motor drive cam assembly whose shaft extends in the direction of disk insertion and ejection and parallel to the hinge axis of a cam-operated disk positioning hub carrier. A cam pin on the shaft actuates the disk ejection and additional cams control stop switches for the motor.

13 Claims, 10 Drawing Figures

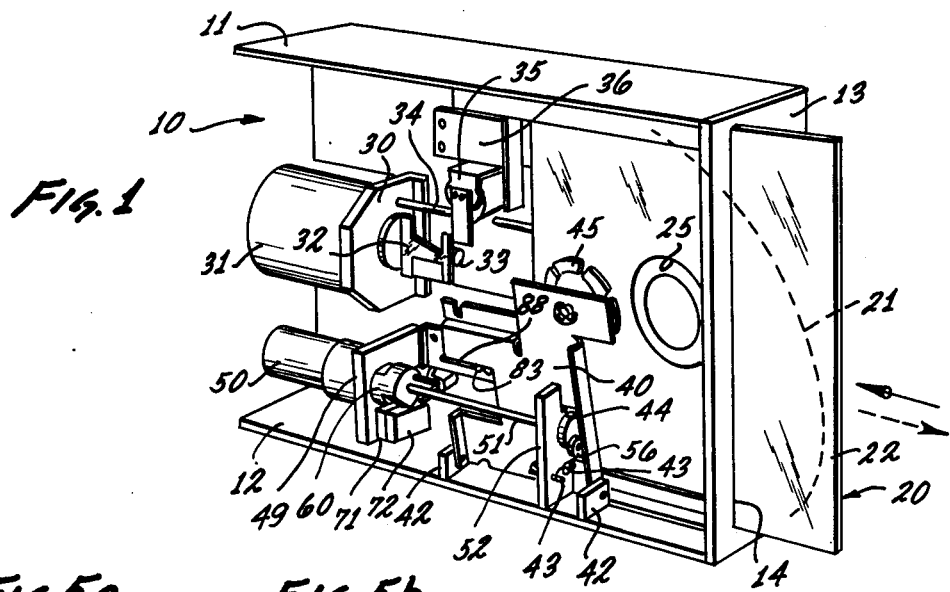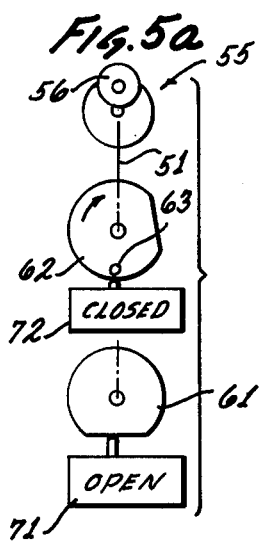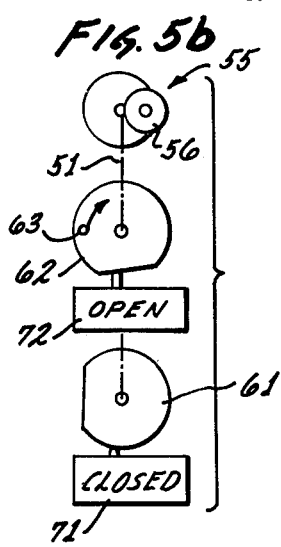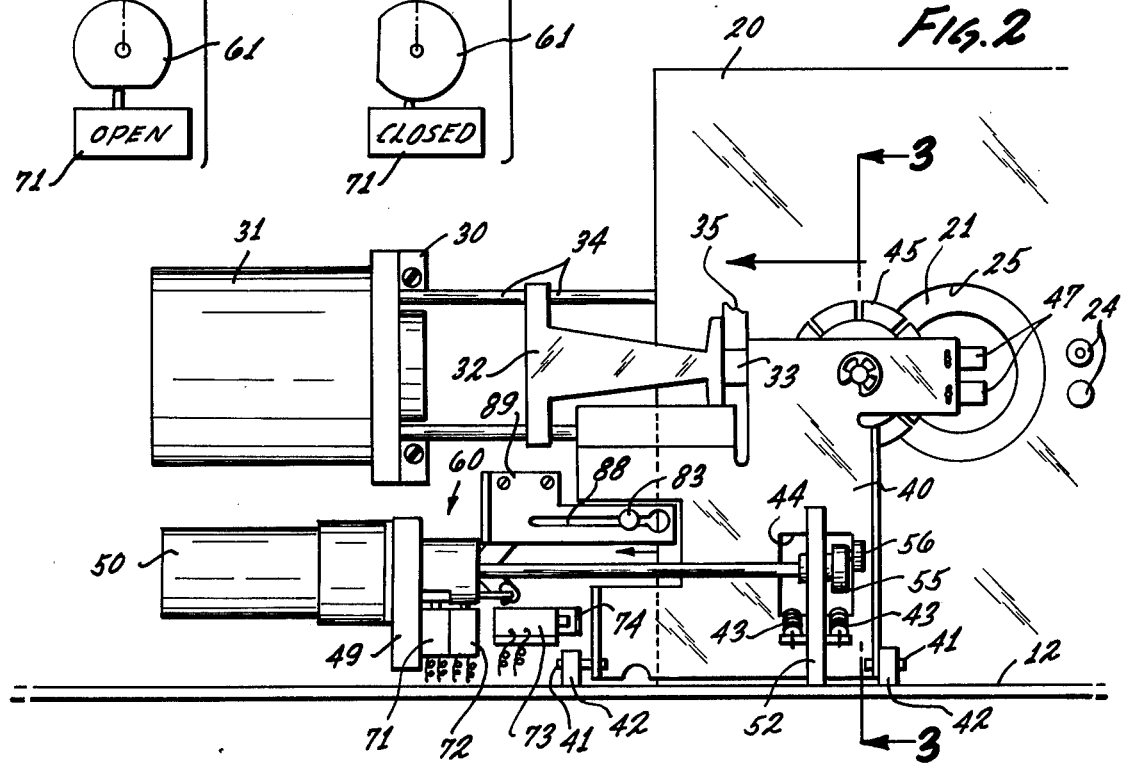

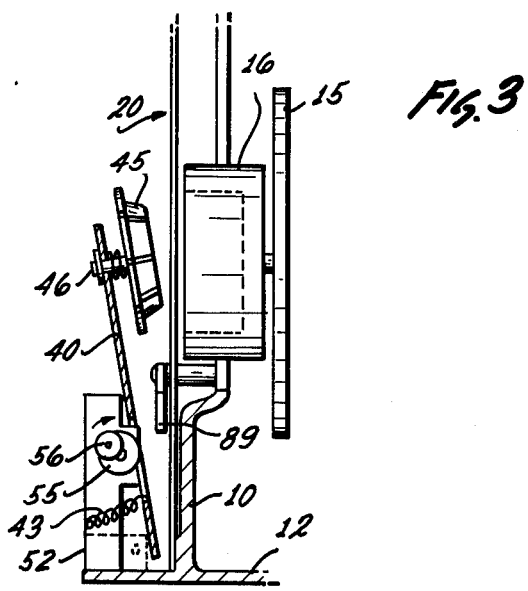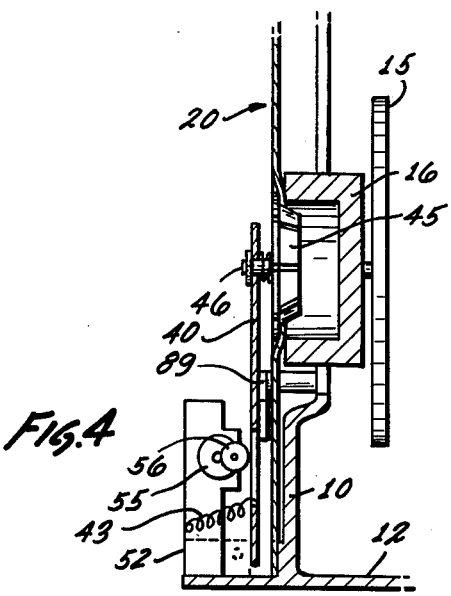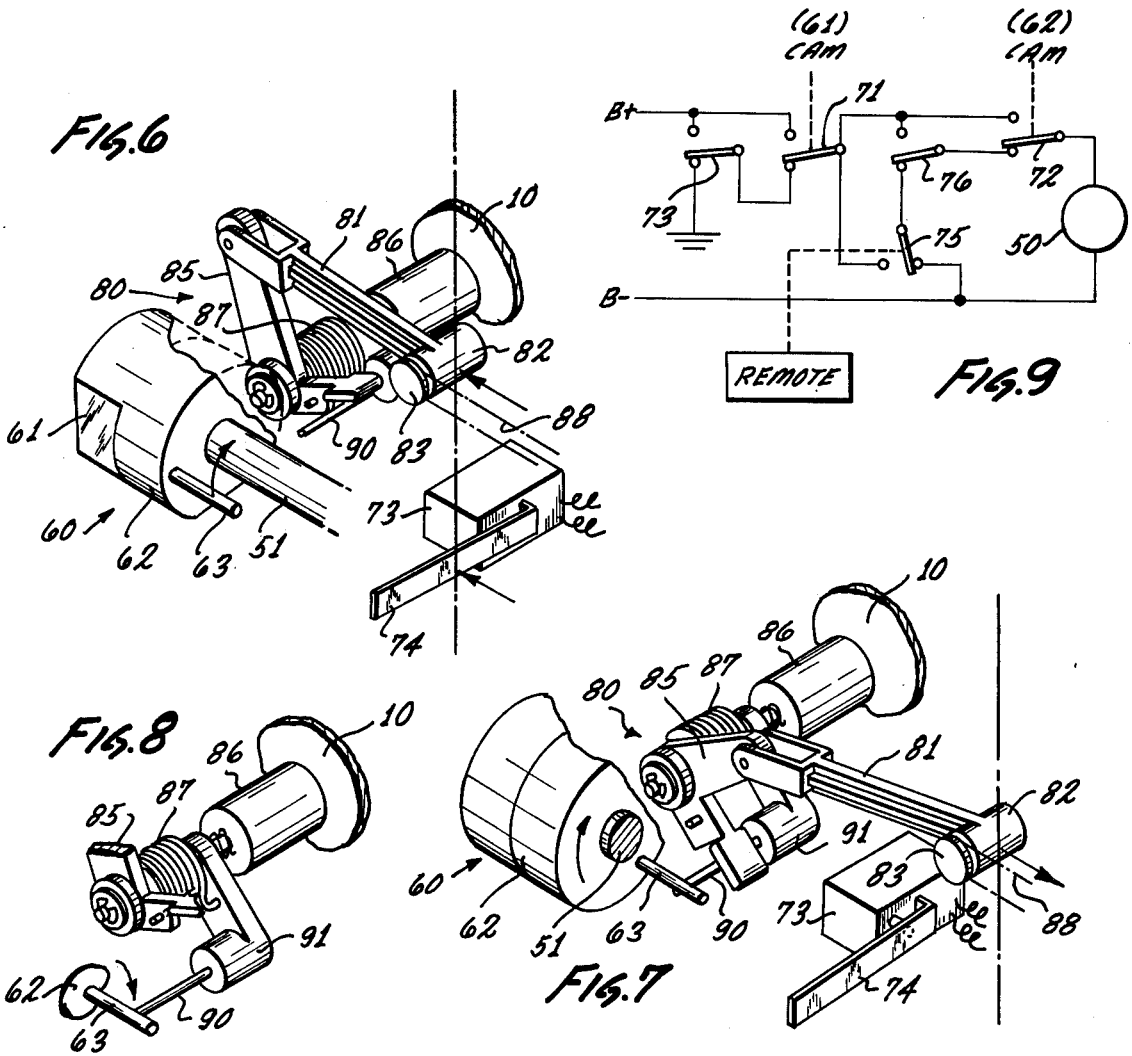

DISK POSITIONING AND EJECTION DEVICE IN A DISK DRIVE

BACKGROUND OF THE INVENTION

The present invention relates to disk drives and more particularly the invention relates to improvements in units of the type which employ exchangeable, flexible magnetic disks.

Disk drive units are used in various places in digital data processing systems. The small size disk units are designed particularly for cooperation with magnetic disks having a flexible substrate; they are sometimes called floppy disks. The disk in such a unit is driven e.g. by a constant speed motor in that the disk is coupled to a motor-driven spindle.

A disk when coupled to the motor-driven spindle, cooperates with a transducer head for read (reproduce) and write (record) operations. The transducer head is positioned by a motor moving the head in radial direction to align the head with a particular track on the disk.

In some instances of employment, the disk unit is not permanently equipped with a particular disk, but the disks are exchangeable. Accordingly, the disks must be placed into the unit, one at a time, and coupled to the drive spindle for turning on a precisely predetermined axis. Whenever the currently used disk is to be exchanged for another one, the former disk must be removed from the spindle as well as from the unit. The exchange should take place in rather simple fashion, obviously without endangering the disk in any manner and without extensive manipulation.

DESCRIPTION OF THE INVENTION

It is an object of the present invention to provide a new and improved positioning system for exchangeable, flexible disks in disk drives;

it is another object of the present invention to provide a new and improved system in disk drives for facilitating insertion and removal of disk, particularly flexible disks.

For purposes of practicing the invention it is readily assumed that a disk is positioned in a, usually square-shaped envelope, the assembly being called a diskette, whereby the envelope has access openings in the center as well as for exposing a limited portion of each track permitting interaction with a read/write transducer. It is thus a particular object of the present invention to provide a new and improved positioning and ejection device for a diskette.

In accordance with the preferred embodiment of the present invention, it is suggested to provide a disk drive unit with a cam-operated, pivotable hub carrier for positioning inserted disks in proper drive position on the disk and for retracting the hub from the disk to permit exchange of the latter. A cam-operated reciprocating ejection mechanism is provided for ejecting a disk to be replaced. The cam operation is under control of a motor, which is phased through a threephase cycle, a disk positioning phase, a hub retraction phase and a disk ejection phase; stop positions being provided between the positioning and retraction phases and at the end of disk ejection phase, which is followed by a positioning phase of the next cycle.

In furtherance of the invention, it is suggested to provide the pivot axis of the carrier alongside the direction of disk insertion and ejection, and a cam is mounted on a motor shaft that extends parallel to that direction as well as to the carrier pivot axis. Another cam on the shaft includes an actuator (e.g. a pin) for moving the ejection mechanism still in the same direction in the above-mentioned third phase. These cams thus establish the three-phase actuator cycle for positioning the hub and ejecting a diskette. Additional cams cooperate with turn-off switches to stop the motor when the cams are (a) in the end portion (completion of ejection) and (b) in a position, wherein the hub carrier has an upright pivot position for positioning and holding the disk on the disk drive spindle. A new cycle is started by a switch that is actuated by a fully inserted disk, and disk removal is initiated by switch operation to move the motor out of can position (b), to continue through the second and third phase of the cycle. The ejection mechanism is preferably provided with an override in case an obstacle prevents actual ejection of the disk.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a perspective view into a disk drive unit having the hub position control and disk ejection mechanism in accordance with the preferred embodiment of the invention;

FIG. 2 is an enlarged side view into the unit as shown in FIG. 1;

FIGS. 3 and 4 are similar section views as indicated by line 3—3 in FIG. 2, showing the hub carrier in different positions;

FIGS. 5a and 5b are exploded schematic views of the cam structure of the device of FIGS. 1 to 4 for two different stop positions.

FIGS. 6 and 7 are similar, fragmentary perspective views of the disk ejection mechanism, but in different operating positions;

FIG. 8 shows a modified operating state of the ejection mechanism; and

FIG. 9 is a circuit diagram for the control of the hub positioning control and of the disk ejection mechanism.

Proceeding now to the detailed description of the drawings, the disk drive system illustrated includes basically a support plate 10 suitably contoured with an upper flange 11 and a lower flange 12 respectively. The unit is constructed as a slide-in module and has a front cover 13 with a slot 14 for insertion of a diskette 20.

As was already mentioned above, a diskette includes a flexible disk 21 with magnetizable surfaces contained in a jacket 22. The disk is free to rotate within the jacket. The jacket has transducer access holes (not shown) and index apertures 24. The disk has a hole whose passage through the apertures 24 is to be detected. The jacket has a central aperture 25 exposing the center aperture of the disk by means of which the disk can be attached to a drive spindle.

A disk drive motor 15 with drive flange or spindle 16 is connected to one side of the plate 10. The same side holds also a printed circuit board (not shown) containing all of the necessary electronics particularly for disk record and retrieve operations. The board holds also electronic circuitry for control of the spindle motor.

A mounting flange 30 is secured to plate 10 for mounting a voice coil motor 31, which drives a carriage 32 carrying the transducer head 33 for reading from and writing on a disk of a diskette when inserted. The carriage rides on two guide rods 34 and carries additionally a position sensing transducer 35 cooperating with a positioning scale plate 36.

During regular operation, a disk is coupled to the spindle 16 to rotate at a constant speed. The transducer on head 33 cooperates with the track which has been selected in conjunction with the carriage positioning control as operating the voice coil motor 31. These operations are conventional in principle.

For purposes of positioning a disk and diskette and ejecting it after use, the following equipment is provided. A diskette as inserted in slot 14 will locate between the two flanges 11 and 12. A hub carrier 40 is pivotably mounted along that space which receives the diskette; the carrier has pivot pins 41 accordingly which turn in bearing elements 42 on flange 11. The carrier 40 carries a conical hub element 45, which can penetrate the aperture in the disk of an inserted diskette. The hub element 45 is mounted for free rotation and is held resiliently on the carrier by means of springs 46.

The carrier 40 has an arm, which carries two miniature light sources 47 provided for cooperation with sensors on the other side of the inserted diskette which monitor the apertures 24 in the diskette jacket for response to the passage of the indexing holes in the disk. The carrier 40 has an aperture 44 the purpose of which will be explained below.

A mounting flange 49 is provided to carry a d.c. motor 50 which controls the positioning and ejection of a diskette. The flange 49 is mounted to plate 10. The motor 50 has a rather long output shaft 51 being journalled in the flange 49 as well as in a bearing member 52. The bearing member 52 serves additionally as anchoring post for a pair of springs 43, which bias the carrier 40 into a position in which the hub member 45 is retracted so that a diskette can be freely inserted.

A cam member is mounted to the end of shaft 51 adjacent bearing member 52. The cam member includes a cam disk or drum 55 on which is mounted excentrically a cam roller 56, which engages the carrier 40 adjacent the opening 44 for a certain range of pivot positions of the carrier.

Upon rotation of shaft 51, carrier 40 basically alternates between two positions. In one position (FIG. 3) the springs 43 pull the carrier 40 against the shaft bearing member 52 serving as a stop or post, and the carrier is held there-against. The hub 45 is fully retracted for this position and a diskette can be freely inserted or removed from the space along one side of plate 10 and between flanges 11 and 12. The cam 55 projects partially into the slot 44 when the carrier 40 has this position.

The other position of the carrier 40 (FIG. 4) is obtained when the cam 56 has been turned to project farthest towards the carrier and holds it in, basically, a vertical disposition. As far as the shaft 51 and the cam 56 is concerned, this position will hereinafter be called position B (see FIG. 5b). It can thus be seen that upon turning of the cam 56 by operation of the motor 50, carrier 40 can be pivoted from a retracted reclining position of resting against post 52 (FIG. 3) to a vertical position corresponding to position B of the cam 56 (FIG. 4, 5b). Upon stopping of motor 50 in that position B the carrier 40 will be held against retracting force of the springs 43 by operation of the most protracted position of cam 56 in horizontal direction. Upon continued rotation of motor 50 the cam roller 56 recedes, but the springs 43 maintain the carrier 40 in engagement with the roller until the carrier abuts post 52. For the remainder of the travel path of cam 56 it is disengaged from the carrier 40, as shown e.g. in FIG. 3, but part of the drum 55 projects into aperture 44.

The shaft 51 carries a multi-purpose cam and control member 60 adjacent to mounting and bearing flange 49. The member 60 has two cam tracks 61 and 62 with particular cam surfaces which are offset by an angle to be explained shortly. The tracks 61 and 62 respectively cooperate with switches 71 and 72, which are connected to interrupt energizing circuits for motor 50. Each of the cam tracks holds its respective switch in one position for most angular positions of the track. The flattened portions place the switches in the respective other position. The angular position of the cams 60 in which the flattened portion of track 61 acts on switch 71 is a stop position for the assembly, called position A. The relative cam and track positions for position A are depicted in FIG. 5a. When the flattened portion of track 62 acts on switch 72, the assembly is in position B (FIG. 5b).

FIG. 9 shows the switches 71 and 72 in positions of actuation by the flattened cam track portion. Actually, these positions are never attained simultaneously so that it is more accurate to say that FIG. 9 shows the switches 71, 72 in positions with the cam 60 removed. Normally, switches 71 and 72 have the alternative position of FIG. 9; however, switch 71 has the illustrated position for cam position A which is the zero, idle or starting position with no diskette inserted. Switch 72 has the illustrated position in cam position B (FIG. 5), which is the operating position of the drive; an inserted disk is being driven by the spindle 16.

A switch 73 with an actuation spring 74 extends across the space for receiving a diskette and actually establishes the barrier beyond which the diskette cannot be pushed. The switch 73 has a (physical) dispostion, so that a diskette when having been inserted and pushed spring 74 against the switch 73 proper to activate it, has a position in which its center hole is aligned axially with the spindle 16.

The switch 73 when actuated in this manner, assumes the alternative position as per the circuit diagram of FIG. 9 and will be connected to the energizing circuit of motor 50, so that the motor is turned on for moving the cam assembly out of position A. Switch 72 has the alternative position, Following diskette insertion and actuation of switch 73, switch 71 changes to the alternative position soon thereafter: The circuit is no longer dependent upon continued actuation of switch 73. The switch 72, however, is connected in the circuit so that upon its assuming the position illustrated in FIG. 9 this particular energizing circuit for the motor 50 is interrupted and the motor 50 stops in cam position B (FIG 5b). This marks the completion of the first and disk positioning phase. As stated above, in this position cam 56 has pivoted carrier 40 into a more upright position, and hub 45 engages the disk of an inserted diskette and urges it against the driving spindle.

A switch 76 is provided on the front panel of the unit. The switch when pressed changes position and completes a separate energizing circuit for the motor 50, so that the cam assembly by moved out of position B back to position A. The initial energizing circuit runs from B+ via the alternative position of switch 76 (having alternative position) and through the switch 72 in the illustrated position. This particular energizing circuit is maintained as soon as switch 72 changes to the alternative position and becomes independent from switch 76. The circuit can be interrupted when switch 71 changes to the illustrated position by operation of the cam surface track 61.

Shortly after motor 50 moves the cam assembly out of position B, cam carrier 40 is folded back as was explained above (second phase of operation). The motor does not stop, but as will be explained shortly, the diskette is ejected during the last phase, at the end of which motor 50 stops in position A. Position A can also be regarded as the Zero point for a full diskette insertion and ejection cycle.

Cam member 60 carries additionally an actuator pin 63 having a particular angular orientation with respect to the cam surfaces on member 60. From a different point of view this pin 63 together with cam 56 establishes the basic cam and actuator means which provides for the last phase of a three-phase operating cycle. The primary determining factor of the phase of the position of pin 63 is its location with respect to a push-out and ejection mechanism 80 to be described first. This ejection mechanism 80 includes a main ejection or push out lever 81 having a front end pin 82, which extends transversely to the direction of extension of lever 81. The pin 82 has a guide portion 83 with retaining flange which is held in a longitudinal slot 88 in a stationary guide and cam element 89. As a consequence, lever 81 can reciprocate back and forth as guide portion 83 of pin 82 moves in the slot 88 and the pin is thereby moved back and forth, into and out of the diskette space.

Lever 81 is linked to the long arm of an L-shaped control lever 85, which is mounted for pivoting on a pin 86; the pin 86 is anchored in plate 10. The short arm of L-lever 85 serves as stop for a pin 90 which projects from a crank 91 which in turn is also journalled on pin 86. A spring 87 is interposed between and anchored to both, lever 85 and crank 91 and urges pin 90 against the short arm of lever 85. Thus, pin 90 on crank 91 as well as lever 85 move normally in unison but upon applying a force tending to turn crank 91 and lever 85 in opposite direction, pin 90 separates from the short arm of the lever 85 while enhancing the bias of the spring 87 tending to restore the position of abutment.

It can thus be seen that lever 85 normally follows any movement of pin 90, whereby lever 81 reciprocates as its pin 82 is held in the guide slot 88, so that lever 81 is forced to follow that actuation movement by the elements 90 and 85. However, upon holding lever 81 in the position shown in FIG. 6, for example, by impeding a forward advance of pin 82 (to the lower right of FIG. 6) while pin 90 turns in counterclockwise direction, pin 90 can actually disengage from the short arm of lever 85, so that lever 81 stays in position, while the spring 87 is loaded.

The lever assembly 81, 85 is positioned so that pin 90 extends transversely to but into the path of pin 63 as the latter is to actuate the former. The lever assembly 81, 85 has disposition in FIG. 6 defined by a completely inserted diskette. FIG. 6 shows also that motor 50 moves the cam assembly out of position B (thereby causing cam 56 to retract to permit springs 43 to fold carrier 40 back). Soon the pin 63 moves into the range of pin 90. The down swing of pin 63 carries pin 90 along, pushing it down and causing L-lever 85 to pivot clockwise so that lever 81 is pushed forward. Thus, the diskette is now pushed out.

The particular position of pin 63 in relation to cam 60 and its tracks 61, 62 is such that pin 63 disengages from pin 90 shortly before cam surface 61 actuates switch 71 which stops motor 50 in position A; this marks completion of a full load-unload or three-phase cycle for the diskette. FIG. 7 shows the last phase of a complete cycle, i.e. the instant just prior to disengagement of pin 63 from pin 90. In position A of the cam assembly pin 63 is all the way down, cam 61 places switch 71 into the illustrated position (FIG. 9) and switch 72 is held in the alternative position.

The function of spring 87 and of crank 91 will now be apparent. The pin 63 forces pin 90 to follow, but if the diskette is prevented by an obstacle from being ejected, the crank 91 will disengage from the short arm of the L-lever 85 which is not forced to follow the counterclockwise movement of crank pin 90 (FIG. 8). Should the obstacle persist, then the spring 87 being loaded upon pin 63 moving pin 90 down, will retract the crank as soon as pins 90 and 63 disengage. If there was no obstacle to begin with, then the assembly 81, 85, 90 will stay in the position shown in FIG. 7 until a new diskette has been pushed in, thereby turning the lever assembly 81, 85, 90 back from the position shown in FIG. 7 to the position shown in FIG. 6.

It should be noted that the system may have an alternative switch 75 to be used in lieu of the local, manual switch 76 for initiating diskette ejection. By remote control (relay operation) switch 75 can be used to apply operating voltage accross motor 50, when switches 74, 72 have the illustrated position.

In operation the device works as follows: In the resting position the motor 50 has stopped in position A (FIG. 5a). The cam 56 is in position ready to pivot the carrier 40, however, the springs 43 hold the carrier back, so that the hub element 45 is retracted from the path of a diskette. The pushout lever 81, 82 was left in the protracted position (FIG. 7). The disk drive motor 15 may run or may have been turned on). Switch 71 is in the illustrated position of FIG. 9, while switch 72 has the alternative position. Thus, motor 50 is held at rest.

As a diskette is inserted its front engages pin 82 of pushout lever 81 and moves the lever back without impediment. The diskette is physically stopped from further insertion upon engagement of the leaf spring 74 actuating shortly thereafter the switch 73 (FIG. 6), whereupon the motor 50 is turned on. The motor 50 turns shaft 51 and the cams out of the position of FIG. 5a, in clockwise direction, whereupon the carrier 40 is pivoted by cam 56. The hub 45 penetrates the central opening of the disk which in turn engages the motor drive flange or spindle 16 and follows the rotation thereof. Also, elements 47 are placed in position to complete the light barrier sensing the index hole in the disk.

As the cam is being turned to position B (FIG. 5b), the hub positioning phase is completed, and cam 62 places the switch 72 in the illustrated position. Previously, however, cam 61 placed switch 71 into the alternative position. As switch 72 changes position, motor 50 is turned off. In this position now attained cam 56 holds the carrier 40 in the operating (vertical) position which ensures continued driving engagement between the disk and the hub.

The ejection of the disk is begun by changing the position of local switch 76 or by remote actuation of switch 75. Actually, the ejection phase must be preceded by a hub retraction phase for disconnecting the disk in the diskette from spindle 16. As either switch 76 or switch 75 change position, a different energizing circuit for the motor 50 is completed, which will turn the shaft 51 with cams out of position B. In the first portion of this turning range, the cam 56 tends to retract from the carrier 40 and accordingly springs 43 pivot the carrier 40 back. Thus, the hub element 45 releases the disk, completing the hub retraction phase. The motor 50 is not stopped at that point, but following complete disengagement of the disk from the driving flange, the third, diskette ejection phase is carried out.

As the cam assembly 60 continues to turn, the pin 63 engages the pin 90 on crank 91 and forces the L-shaped lever 85 down. Accordingly, the L-lever 85 moves pushout lever 81 forward, guide pin 83 sliding forward in slot 88. Pin 82 engages the diskette 20 and moves it out for a particular distance (arrow in FIG. 7). Shortly after the pin 63 disengages the pin 90, the cam track 61 actuates the switch 71 and turns off the motor 50. The drive assembly has reached again position A and completed on cycle.

If for any reason the diskette cannot be ejected, e.g. there is an obstacle in front, the pin 63 will still move the pin 90 down, but L-lever 85 cannot follow. Thus, the spring 87 is loaded. If the obstacle is removed while the pins are still engaged, the spring will relax and cause levers 85, 81 complete the pushing out of the diskette. If the obstacle is not removed, pin 90 will snap back as soon as disengaging from pin 63. If the diskette 20 was not moved at all, switch 73 remains in the alternative position and the motor 50 will actually not stop in position A, but will proceed immediately again to position B. If the disk was moved a little it will have to be pushed in again. In either of these two cases switch 76 or remote switch 75 have to be actuated anew to complete the ejection.

The invention is not limited to the embodiments described above, but all changes and modifications thereof not constituting departures from the spirit and scope of the invention are intended to be included.

I claim:

1. In a disk drive having a rotatable spindle for coupling to a disk to be inserted into the drive and in particular direction, a positioning and ejection mechanism mounted in a support comprising:
 a hub member;
 a carrier for the hub member and mounted for pivoting to assume a protracted and a retracted position, the hub member being mounted for freely rotating on the carrier;
 an ejection device mounted in said support for reciprocating motion in said particular direction and opposite thereto;
 a control motor;
 a first cam assembly rotatably connected to the motor and establishing a three-phase cam cycle, the first assembly having means so that in a first phase of the cycle the cam assembly is coupled to the carrier to push the carrier from the retracted to the protracted position, in a second phase of the cycle the cam assembly is coupled to the carrier to move the carrier from the protracted to the retracted position, in the third phase of the cycle the cam assembly operates the ejection device for causing ejection of a disk;
 a second cam assembly coupled to the motor;
 a first switching device cooperating with the second cam assembly and connected to the motor for stopping the motor in a position between the first and the second phases and the second and third phases, respectively; and
 a second switching device for starting the motor from either of said stopping positions.

2. In a disk drive as in claim 1, wherein the first cam assembly means includes a cam (i) for engaging and operating said carrier and a cam means (ii) for operating the ejection device.

3. In a drive as in claim 2, wherein the cam means (ii) includes a pin, the ejection device includes a reciprocating lever, and lever means for selectively coupling to and disconnection from said pin as it rotates thereby causing the reciprocating lever to advance during a particular range of angular pin movement.

4. In a drive as in claim 3, wherein the lever means is provided for selective disconnection of the reciprocating lever from said pin when said reciprocating lever is impeded from ejecting a disk.

5. In a drive as in claim 2, wherein the cam (i) and the cam means (ii) are on a common shaft extending alongside a pivot axis for said carrier.

6. In a drive as in claim 1, said second switching device including a switch with an actuator extending across a path of entrance for a disk and being actuated upon insertion of the disk in the path.

7. In a disk drive having a rotatable spindle for coupling to a disk to be inserted into the drive by shifting the disk in a first direction, the disk positioning and ejection device comprising:
 a hub carrier pivotably mounted in the drive and carrying a hub element for engaging a disk when inserted;
 a control motor;
 circuit means including switches for controlling operation of the control motor;
 a first cam rotatably connected to the control motor for causing the carrier to pivot between a hub-disk-spindle engaging position and a hub retracting position;
 a reciprocating ejection device positioned for ejecting a disk at least partially from the drive;
 a second cam connected to the control motor for being driven by the motor and operatively coupled to an ejection lever for causing the ejection device to push a disk out of the inserted position;
 third cam means rotatably connected to the motor for operating particular ones of the switches in the circuit means for causing the motor to stop when the carrier is in said hub-disk-spindle engaging position; and
 other particular ones of said switches in the circuit means being provided for controlling restarting the motor after having stopped.

8. In a drive as in claim 7, said ejection device including an ejection lever mounted and guided for reciprocating motion;
 a turning lever means for moving the ejection lever; and
 means including a pin coupled to the second cam for at least part of a complete revolution thereof for operating said turning lever means.

9. In a drive as in claim 8, said means including a spring biased crank and connected to the turning lever to permit disengagement of the turning lever from the crank, so that the second cam can move the crank even if the turning lever is prevented from turning.

10. In a drive as in claim 8, said second cam including a pin mounted for rotation on a shaft driven by said control motor.

11. In a disk drive having a rotatable spindle for coupling to a disk to be inserted into the drive and in a particular direction, a positioning and ejection mechanism comprising:
- a hub carrier provided for pivoting on an axis parallel to said particular direction;
- a hub mounted on the carrier for rotation;
- a control motor having a shaft extending parallel to said axis;
- a first cam on said shaft for engaging the carrier and moving the carrier into a position and holding it in the position in which the hub holds an inserted disk against the drive spindle, the carrier being retracted in all other positions of the first cam during a complete revolution;
- a reciprocating ejection mechanism disposed for ejecting an inserted disk;
- a second cam on the shaft and coupled to the ejection mechanism to translate rotational movement of the cam into a protracting movement of the ejection mechanism during a particular angular range of cam movement;
- third cam means on the shaft;
- first switching means operated by the third cam means for stopping the motor in a position, wherein the first cam holds the carrier in said first position, and in a position wherein the ejection mechanism has been fully protracted; and
- second switching means connected for controlling the motor for moving the motor out of said stopping positions.

12. In a drive as in claim 11, the second cam providing actuation motion in a plane transversely to said shaft, said reciprocating mechanism including means (i) temporarily coupled to said second cam to be responsive to said actuation motion and translating said motion into the reciprocating motion parallel to said shaft, and means (ii) coupled to the means (i) for providing the reciprocating and ejecting motion.

13. In a device as in claim 12, said means (i) including lever means pivoting on an axis that extends transversely to said shaft but parallel to said plane, the means (ii) being a reciprocating lever linked to the pivoting lever means.

* * * * *